Patented May 14, 1946

2,400,469

UNITED STATES PATENT OFFICE 2,400,469

N-(THIAZYL-THIO-METHYLENE) URETHANES

Winfield Scott, deceased, late of Akron, Ohio, by Ruth P. Scott, executrix, Akron, Ohio, assignor to Wingfoot Corporation, Akron, Ohio, a corporation of Delaware No Drawing. Application August 13, 1943, Serial No. 498,592

6 Claims. (Cl. 260—306.6)

This invention relates to N-(thiazyl-thio-methylene) urethanes and the process for making the same.

Many materials are known which function as accelerators of the vulcanization of rubber. Different accelerators produce different rates of vulcanization and the choice of accelerator also determines to a large degree the physical characteristics and quality of the vulcanized rubber. According to the present invention, a new type of accelerator has been discovered which produces an efficient vulcanization and gives a vulcanized rubber product having excellent properties. The accelerators of the invention are obtained by the interaction of a 2-mercaptothiazole, formaldehyde and a urethane.

The preparation of these accelerators is illustrated by the following examples:

Example 1

Equimolecular proportions of N-methylol urethane and 2-mercaptobenzothiazole were heated over a gas burner, water being split out. The resulting product was dissolved in chloroform and precipitated by the addition of ether. The white product (which turned light yellow in the air) melted at 127–131° C. Several recrystallizations from alcohol gave a melting point of 149–150° C. The yield of crude product was quantitative.

Example 2

A mixture of 17 grams of 2-mercaptobenzothiazole, 9 grams of urethane, 4 grams of paraformaldehyde, 50 cc. of toluene and a few drops of piperidine was refluxed until about 1.7 cc. of water had been trapped out. On cooling the solution, crystals separated. The yield was 20 grams, melting at 152° C. Recrystallized twice from benzene, the product melted at 153° C. Analysis of the product showed 23.78% sulfur and 10.48% nitrogen. The calculated values for N-(benzothiazyl-thio-methylene) urethane are 23.90% sulfur and 10.40% nitrogen.

The mechanism of reaction may be represented by the following equations:

(1) $C_2H_5\text{-}O\text{-}\overset{O}{\overset{\|}{C}}\text{-}NH_2 + HCHO \longrightarrow C_2H_5\text{-}O\text{-}\overset{O}{\overset{\|}{C}}\text{-}NH\text{-}CH_2OH$ (2) $C_2H_5\text{-}O\text{-}\overset{O}{\overset{\|}{C}}\text{-}NH\text{-}CH_2OH +$

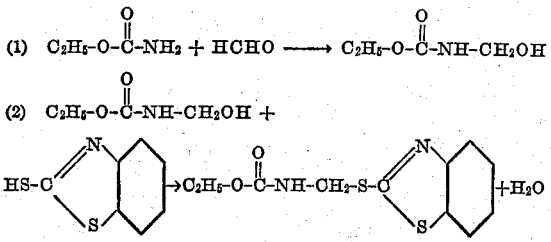

In addition to the 2-mercaptobenzothiazole used in the examples, various other 2-mercaptothiazoles may also be used, including 2-mercapto-4-methylthiazole, 2-mercapto-4,5-dimethylthiazole, 2-mercapto-4-ethylthiazole, 2-mercaptoquinoline, 2-mercaptothiazoline, 2-mercapto-6-nitrobenzothiazole, 2-mercapto-6-chlorbenzothiazole, 2-mercapto-4-phenylbenzothiazole, 2-mercapto-4-methylbenzothiazole, 2-mercapto-6-ethoxybenzothiazole, 2-mercapto-6-methoxybenzothiazole, 2-mercapto-6-chlor-5-nitrobenzothiazole, 2-mercapto-6-hydroxybenzothiazole, 2-mercapto-5-nitrobenzothiazole, 2-mercapto-5-chlorbenzothiazole, the 2-mercapto-alpha and beta-naphthothiazoles, and other alkyl, aryl, nitro, hydroxy, halo, alkoxy, etc. derivatives of mercaptothiazoles. The 2-mercapto-arylenethiazoles and particularly the 2-mercaptobenzothiazoles constitute preferred classes.

As already indicated, paraformaldehyde and other materials which are the equivalent of formaldehyde may also be employed.

Likewise, other urethanes may also be employed in place of the urethane of the examples. In general, these urethanes may be represented by the structural formula

in which $R_1$ is selected from the group consisting of alkyl and aralkyl radicals and hydrogen, X is selected from the group consisting of oxygen and sulfur, and $R_2$ is selected from the group consisting of alkyl and aralkyl radicals. Further representative examples are methyl urethane, propyl urethane, isopropyl urethane, N-methyl urethane, benzyl urethane, furfuryl urethane, cyclohexyl urethane, N-ethyl butyl urethane, etc.

Thus, the accelerator compounds may be represented by the structural formula

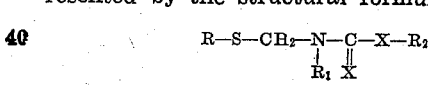

in which R is a thiazyl radical, $R_1$ is selected from the group consisting of alkyl and aralkyl radicals and hydrogen, X is selected from the group consisting of oxygen and sulfur and $R_2$ is selected from the group consisting of alkyl and aralkyl radicals.

The accelerators of the invention are readily incorporated into rubber and produce excellent cures. For example, N-(benzo-thiazyl-thio-methylene) urethane was compounded in rubber according to the following formula:

| | Parts by weight |
|---|---|
| Smoked sheet rubber | 100.0 |
| Zinc oxide | 5.0 |
| Sulfur | 3.0 |
| Diphenylguanidine | 0.1 |
| Accelerator | 0.5 |

A very good cure was obtained in 60 minutes at 240° F. The ultimate tensile strength was 190 kg./sq. cm. The ultimate elongation was 755%, and the modulus at 500% elongation was 34 kg./sq. cm.

What is claimed is:

1. As a new composition of matter, a compound having the structural formula $$R-S-CH_2-N(R_1)-C(=X)-X-R_2$$

in which R is a thiazyl radical, $R_1$ is selected from the group consisting of alkyl and aralkyl radicals and hydrogen, X is selected from the group consisting of oxygen and sulfur and $R_2$ is selected from the group consisting of alkyl and aralkyl radicals.

2. As a new composition of matter, an N-(thiazyl-thio-methylene) urethane having the structural formula $$R-S-CH_2-N(R_1)-C(=X)-R_2$$

in which R is a thiazyl radical, $R_1$ is selected from the group consisting of alkyl and aralkyl radicals and hydrogen, X is oxygen and $R_2$ is selected from the group consisting of alkyl and aralkyl radicals.

3. As a new composition of matter, an N-(arylenethiazyl-thio-methylene) urethane having the structural formula $$R-S-CH_2-N(R_1)-C(=X)-R_2$$

in which R is an arylenethiazyl radical, $R_1$ is selected from the group consisting of alkyl and aralkyl radicals and hydrogen, X is oxygen and $R_2$ is selected from the group consisting of alkyl and aralkyl radicals.

4. As a new composition of matter, an N-(arylenethiazyl-thio-methylene) thiourethane having the structural formula $$R-S-CH_2-N(R_1)-C(=X)-R_2$$

in which R is an arylenethiazyl radical, $R_1$ is selected from the group consisting of alkyl and aralkyl radicals and hydrogen, X is sulfur and $R_2$ is selected from the group consisting of alkyl and aralkyl radicals.

5. As a new composition of matter, an N-(benzothiazyl-thio-methylene) urethane having the structural formula $$R-S-CH_2-N(R_1)-C(=X)-R_2$$

in which R is a benzothiazyl radical, $R_1$ is selected from the group consisting of alkyl and aralkyl radicals and hydrogen, X is oxygen and $R_2$ is selected from the group consisting of alkyl and aralkyl radicals.

6. As a new composition of matter, an N-(benzothiazyl-thio-methylene) thiourethane having the structural formula $$R-S-CH_2-N(R_1)-C(=X)-R_2$$

in which R is a benzothiazyl radical, $R_1$ is selected from the group consisting of alkyl and aralkyl radicals and hydrogen, X is sulfur and $R_2$ is selected from the group consisting of alkyl and aralkyl radicals.

RUTH P. SCOTT,
*Executrix of the Last Will and Testament of Winfield Scott, Deceased.*